United States Patent [19]

Royce, deceased

[11] 4,155,468

[45] May 22, 1979

[54] VEHICLE MOUNTED ACCESS RAMP ASSEMBLY FOR WHEEL CHAIR USERS

[75] Inventor: Robert E. Royce, deceased, late of Englewood, Colo., by Sandra A. Royce, administratrix

[73] Assignee: The Robert E. Royce Revocable Trust, Denver, Colo.

[21] Appl. No.: 802,024

[22] Filed: May 31, 1977

[51] Int. Cl.² ............................................. B60D 1/44
[52] U.S. Cl. ................................... 414/556; 14/71.3; 340/87; 414/537; 414/921
[58] Field of Search ................ 214/75 R, 75 T, 77 R, 214/77 P, 85, DIG. 13; 296/61; 340/84, 87, 142; 14/71.3, 71.7

[56] References Cited

U.S. PATENT DOCUMENTS

| | | | |
|---|---|---|---|
| 2,844,810 | 7/1958 | Steele | 340/87 |
| 3,176,334 | 4/1965 | Lovdahl | 214/85 X |
| 3,452,190 | 6/1969 | Senseman | 340/87 X |
| 3,651,965 | 3/1972 | Simonelli et al. | 214/75 T X |
| 3,846,860 | 11/1974 | Kummerman | 214/15 R X |
| 3,861,739 | 1/1975 | Kinney | 214/85 X |
| 3,874,527 | 4/1975 | Royce | 214/77 R |
| 3,984,014 | 10/1976 | Pohl | 214/75 T X |
| 4,010,859 | 3/1977 | Ronian et al. | 214/77 R |

Primary Examiner—L. J. Paperner
Attorney, Agent, or Firm—Burton & Dorr

[57] ABSTRACT

A ramp assembly for use with a vehicle to provide access to and from the vehicle. The ramp assembly is particularly suited for use by people confined to a wheel chair. The assembly includes a control lever pivotally mounted to a ramp member of the assembly to support a control switch at hand level to someone in a wheel chair. The control lever abuts a portion of the vehicle as the ramp assembly closes and is supported in a substantially vertical position when the assembly is closed to increase the space available within the vehicle. The motor drive for the ramp assembly is positioned on the vehicle between two pivotally mounted ramp members to further increase the available space within the vehicle over past assemblies. The present ramp assembly includes a number of safety features including a warning light system that is turned on when the ramp assembly is in use, automatic stops for the ramp assembly's motor, built-in steps for persons walking on the ramp assembly or pushing a wheel chair over the assembly, windows in the main ramp member for increased visibility, and means to positively move the outer ramp members to a position substantially coplanar with the main ramp member for easy movement between the ramp assembly and the ground.

13 Claims, 14 Drawing Figures

Fig_1

Fig_14

Fig_3

Fig_2

VEHICLE MOUNTED ACCESS RAMP ASSEMBLY FOR WHEEL CHAIR USERS

FIELD OF THE INVENTION

This invention relates to the field of ramp assemblies mountable to a vehicle for providing access to and from the vehicle. The invention is particularly suited for use by persons confined to a wheel chair.

BACKGROUND OF THE INVENTION AND PRIOR ART

Many persons confined to wheel chairs are fully capable of driving motor vehicles by the use of hand controls but find their opportunities to do so restricted by the fact that they require assistance in entering and leaving the vehicle. Prior ramp assemblies such as U.S. Pat. Nos. 3,651,965 to Simonelli et al. issued Mar. 28, 1972, 3,710,962 to Fowler, Jr. issued Jan. 16, 1973 and 3,847,292 to Williams et al. issued Nov. 12, 1974 which have a horizontal platform that is vertically moved present problems to people in wheel chairs when the ground adjacent to the vehicle is not smooth or when the vehicle is not parked on level ground. In such instances, the outer edge of the platform is often unable to completely and continuously contact the ground making movement between the ramp and the ground difficult for someone in a wheel chair. Further, the controls for such assemblies are often difficult for a person in a wheel chair to reach and operate necessitating the assistance of another person. Such assemblies are generally bulky and have portions that protrude into the vehicle when the ramp assembly is in the closed position. These protruding portions greatly reduce the available space within the vehicle.

Other examples of ramp assemblies that have a vertically moving platform are U.S. Pat. Nos. 2,530,341 to Satsky issued Nov. 14, 1950 and 3,258,139 to Ridgeway issued June 28, 1966.

U.S. Pat. No. 3,874,527 to Royce issued Apr. 1, 1975 is an example of a ramp assembly having at least one ramp member that pivots relative to the vehicle between an open position providing access to and from the interior of the vehicle and a substantially vertical, closed position. Royce's ramp assembly has a control member that protrudes outwardly from a ramp member to a position within easy reach of a person on the ramp assembly. A person confined to a wheel chair can move himself onto the lowered ramp assembly and manipulate the control member to raise the assembly to a substantially horizontal position from which he can move himself into the vehicle. To leave the vehicle, the procedure is reversed. Assemblies like Royce's also have additional control panels for the ramp assembly located outside and inside the vehicle.

U.S. Pat. Nos. 2,783,080 to Ringesby issued Feb. 26, 1957, 3,711,882 to Iller issued Jan. 23, 1973, and 3,846,860 to Kummerman issued Nov. 12, 1974 illustrate various arrangements for raising and lowering ramps. Kummerman also illustrates the use of position sensing switches to control the motors moving the ramp members.

The ideal vehicle ramp assembly for a person confined to a wheel chair would provide easy access to and from the vehicle, controls within easy reach, and smooth contact with the ground. It would also include a number of safety features such as warning lights, automatic stops, and steps for someone pushing a wheel chair. Further, it would be fully operable by one person in a wheel chair and take up as little room as possible within the vehicle as well as being lightweight, durable, and aesthetically pleasing. The present invention provides such a ramp assembly.

SUMMARY OF THE INVENTION

The ramp assembly of the present invention is designed to provide easy access to and from the interior of a vehicle through an opening therein. The assembly includes a plurality of ramp members with two of the ramp members being pivotally mounted to the vehicle adjacent the opening. A motor arrangement reversably moves the ramp assembly between an open position providing access to and from the interior of the vehicle through the opening and a substantially vertical, closed position. One control means for the operation of the ramp assembly includes an elongated member pivotally mounted to one of the ramp members and having a switch means on a first portion thereof. In one embodiment, the pivotal movement of the first portion of the elongated member towards the ramp assembly when the assembly is in the open position is limited by a strap member. The strap member maintains the first portion of the elongated member at an angle away from the ramp assembly and keeps the switch means on the first portion at approximately hand level to a person in a wheel chair. The invention also includes an arrangement whereby the first portion of the elongated member is maintained in a substantially upright position when the ramp assembly is closed so that very little of the ramp assembly protrudes into the interior of the vehicle. This feature increases the available space within the vehicle over past assemblies.

The ramp assembly further includes a warning light system, step arrangement to aid those walking into the vehicle or pushing a wheel chair into the vehicle, and limit switches to automatically stop the motor when the ramp assembly is in its open or closed position. The warning light system includes a flashing light that is turned on when the ramp assembly is away from its closed position to warn everyone in sight of the light that the ramp assembly is being used. The flashing light is particularly desirable to alert oncoming cars to the fact that the ramp assembly is protruding beyond the normal bounds of the vehicle. Lights on the interior of the vehicle are also activated when the ramp assembly is in use to warn those in the vehicle that the assembly is down and to ensure that the driver does not drive off without raising the ramp assembly into the closed position. The invention may also include fiberglass skins mounted to the inside and outside of the ramp assembly to improve the looks and strength of the assembly without adding a great amount of weight to it. The ramp assembly of the present invention is about thirty pounds lighter than other commercially available assemblies. The inside fiberglass skins also provide a surface to which carpeting or panelling can be easily attached.

OBJECTS OF THE INVENTION

It is an object of this invention to provide a new and novel ramp assembly for easy access to and from a vehicle.

It is an object of this invention to provide a new and novel ramp assembly mountable to a vehicle and operable by a person confined to a wheel chair without the necessity of having assistance to enter and leave the vehicle.

It is an object of this invention to provide a ramp assembly with a new and novel warning light system to inform people in sight of the lights that the ramp assembly is in use. This feature warns oncoming cars that the ramp assembly is protruding beyond the normal bounds of the vehicle and reminds the driver of the vehicle that the ramp assembly needs to be raised before he drives off.

It is another object of this invention to provide a ramp assembly with a new and novel control means pivotally mounted to a ramp member. The control member is supported with a switch means at approximately hand level for someone in a wheel chair when the ramp assembly is down and supported in a substantially upright position when the ramp assembly is closed.

Another object of this invention is to provide a new and novel ramp assembly that protrudes a minimum amount of distance into the vehicle when the ramp assembly is closed to provide increased space within the vehicle over past assemblies.

It is an object of this invention to provide a ramp assembly with a new and novel moving arrangement for increased efficiency and safety to passengers within the vehicle.

It is an object of this invention to provide a ramp assembly with a new and novel step means built into one of the ramp members. The step arrangement further includes a portion of the motor means for the ramp assembly that is positioned to be in alignment with the step means on the ramp member when the ramp assembly is in the open position to afford easier access to and from the vehicle for persons walking or pushing a wheelchair.

It is an object of the invention to provide a ramp assembly with a new and novel means to automatically stop the motor drive for the ramp assembly when the ramp assembly is in the closed or open position.

It is an object of the invention to provide a ramp assembly with a new and novel arrangement of ramp members that more completely and continuously contact the ground for smoother passage of a wheel chair between the ramp assembly and the ground.

Another object is to provide a new and novel ramp assembly with fiberglass skins to add strength to the assembly without adding a great deal of weight. The fiberglass skins also provide a smooth surface for attaching carpeting, panelling, and the like.

It is also an object of this invention to provide a new and novel ramp assembly with windows therein for improved visibility.

Another object is to provide a new and novel ramp assembly that is lightweight.

Other objects and features of the invention will become apparent by reference to the accompanying drawings and specification

BRIEF DESCRIPTION OF THE DRAWINGS

FIG. 9 is a view along the line 9—9 of FIG. 5 showing the bottom side of the ramp member which has the built-in step means. FIG. 9 also shows the cut-out portion of this ramp member that is pivoted about the step cover over the motor means.

DETAILED DESCRIPTION OF THE PREFERRED EMBODIMENTS

Figure 1:
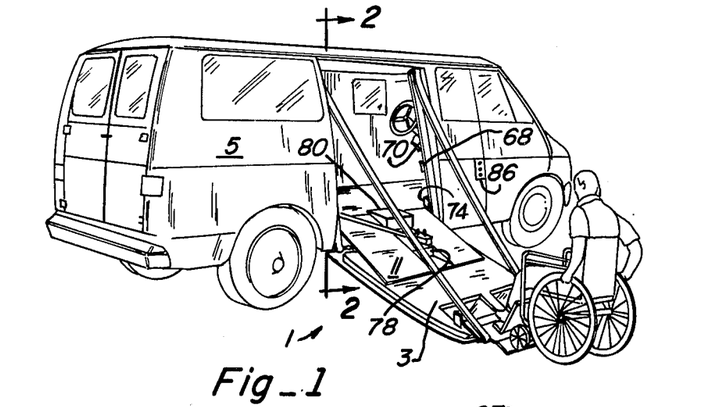
FIG. 1 is a perspective view of the ramp assembly in an open position providing access to and from the interior of the vehicle.
Figures 2, 3, 14:
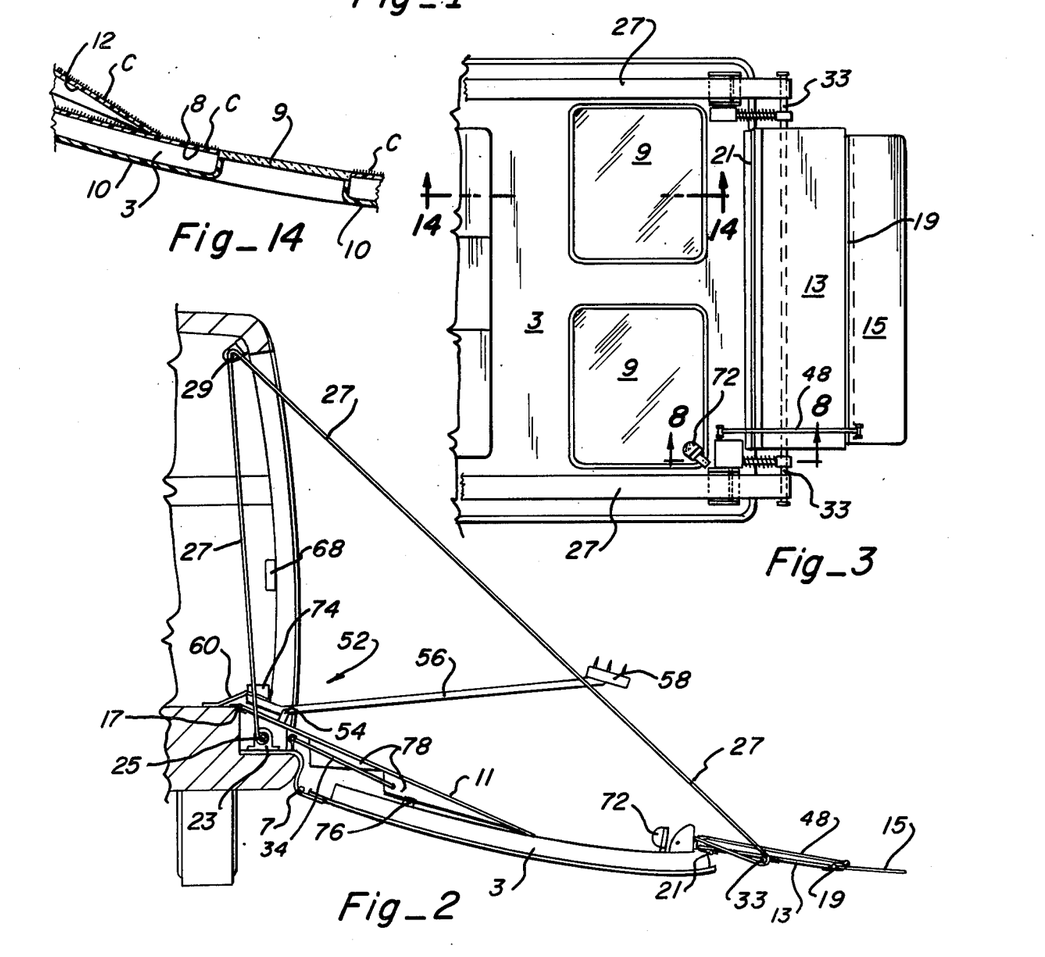
FIG. 2 is a view of along line 2—2 of FIG. 1 showing the ramp assembly in an open position.
FIG. 3 is an elevated view of the outer ramp members of the assembly that contact the ground.
FIG. 14 is a view along line 14—14 of FIG. 3 illustrating the fiberglass skins and carpeting that can be included in the ramp assembly.

Referring to FIGS. 1-4, the ramp assembly 1 has a main ramp member 3 pivotally mounted to the vehicle 5 for movement about an axis 7. The main ramp member 3 is made by binding the standard double doors of the vehicle 5 together and then remounting them for movement about the horizontal axis 7. In one embodiment, molded fiberglass skins 8 and 10 are mounted to the outside and inside of the bounded double doors of the main ramp member 3 as shown in FIG. 14. Windows 9 are then mounted to be flush with the upper surface of the fiberglass skin 8. The fiberglass skin 8 provides a smooth surface to which carpeting C or panelling can be easily attached to improve the looks of the ramp assembly 1 and its traction. The outer fiberglass skin 10 not only improves the looks of the ramp assembly 1 but also improves its weatherability. The ramp assembly 1 further includes ramp member 11 and outer ramp members 13 and 15. Ramp member 11 is pivotally mounted to the vehicle 5 for movement about a horizontal axis 17 as shown in FIG. 2. Outer ramp members 13 and 15 are pivotally mounted to each other at 19 and ramp member 13 is pivotally mounted to the main ramp member 3 at 21. The ramp member 11 can also have a fiberglass skin 12 attached to it with carpeting C or panelling mounted on the fiberglass skin 12 as shown in FIG. 14. Fiberglass skin 12 like skins 8 and 10 not only provides a smooth surface for carpeting C or panelling and increased weatherability but also adds strength to the ramp assembly 1 without greatly increasing the weight of it.

Figures 5, 6, 7:
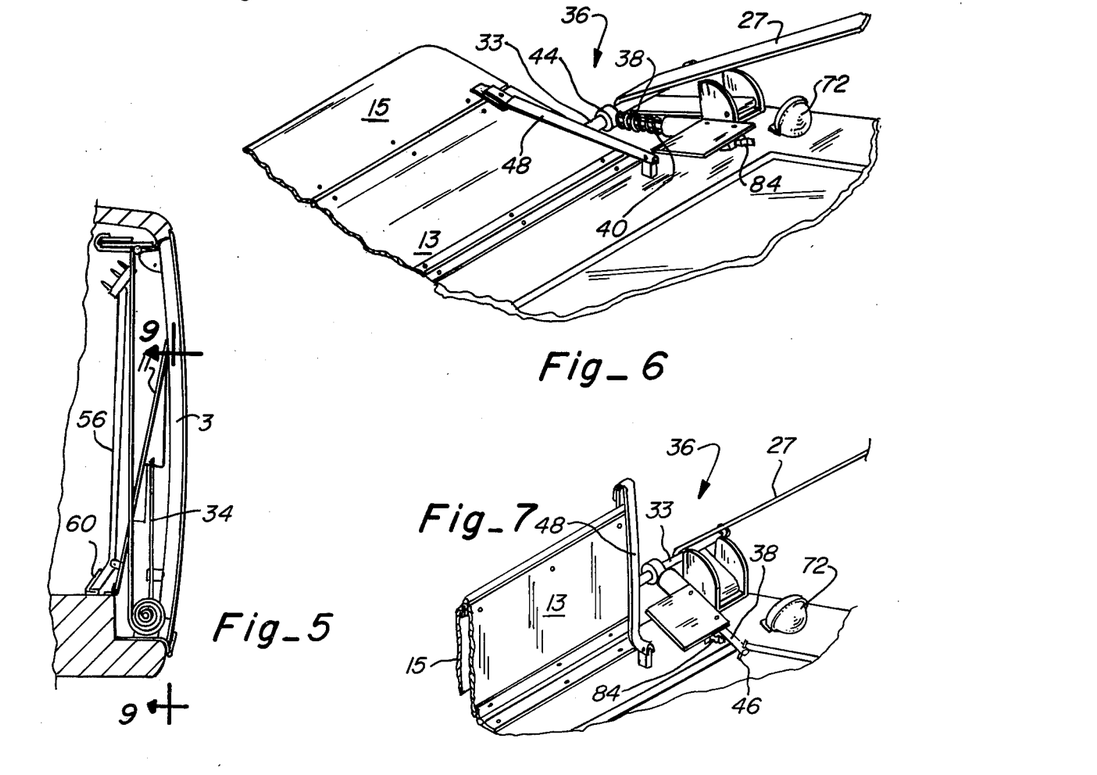
FIG. 5 shows the ramp assembly in a substantially vertical, closed position in which the elongated control member is supported in an upright position.
FIG. 6 illustrates the open position of the outer ramp members that contact the ground. When the ramp assembly reaches this position, the drive means for the assembly is automatically stopped.
FIG. 7 is a view similar to FIG. 6 showing the outer ramp members in the position of FIG. 2. The outer ramp members assume this position as the ramp assembly is being raised or lowered.
Figure 8:
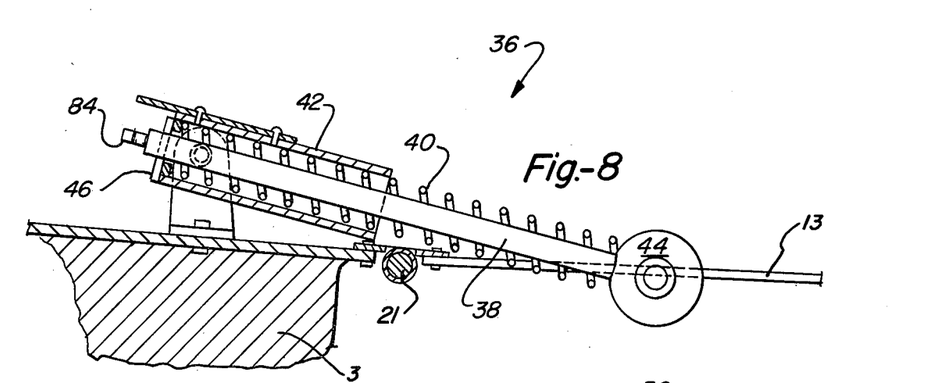
FIG. 8 is a view along line 8—8 of FIG. 3 showing the means that biases the outer ramp members in a substantially coplanar open position.

As best seen at FIGS. 2, 5–7, and 9, the arrangement for moving the ramp assembly 1 between its substantially vertical, closed position and an open position providing access to and from the vehicle includes motor 23 with the rotatable member 25 to which one end of each strap member 27 is secured. Each strap member 27 passes over support pulley 29 located at the top to the opening of the vehicle 5 and is secured at the other end to the main ramp member 3. As shown in FIGS. 3, 6 and 7, the strap members 27 pass over the bar 33 which is connected below the ramp member 13. The moving arrangement further includes resilient members 34 in FIGS. 5 and 9 connected to the vehicle 5 and to the lower side of ramp member 11 to bias the ramp member 11 against the main ramp member 3. During lowering of the ramp assembly, the motor 23 rotates member 25 to unwind the strap members 27. The resilient members 34 biasing the ramp member 11 against the main ramp member 3 will initially move the main ramp member 3 about the pivotal axis 7 to begin opening the ramp assembly 1. As the center of gravity of the ramp assembly 1 moves outwardly of the vehicle 5, gravitational forces combine with the force of the resilient members 34 to move the ramp assembly 1 downwardly. The motor 23 controls the rate of descent. When the main ramp member 3 hits the ground, biasing means 36 in FIGS. 6–8 moves the ramp member 13 to a position substantially coplanar with the main ramp member 3. The biasing means 36 in FIG. 8 includes rod member 38, spring 40, and sleeve member 42 which slideably receives the rod member 38. The sleeve member 42 limits movement of the rod member 38 in either direction by contacting the end sections 44 and 46 of the rod member 38. As the biasing means 36 moves the rod member 13 into a substantially coplanar alignment with the main ramp member 3, strap member 48 in FIGS. 6 and 7 connected between ramp member 15 and the main ramp member 3 pivots ramp member 15 into substantially coplanar alignment with ramp member 13 and main ramp member 3. During closing, the procedure is reversed.

Figure 11:
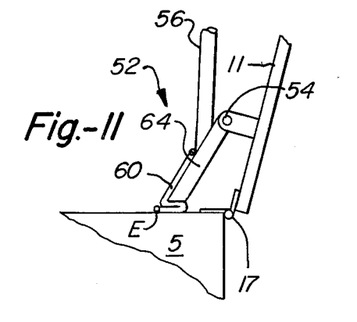
FIG. 11 shows the details of the elongated control member when the ramp assembly is closed. A portion of the control member pinches a fold of the strap between the floor of the vehicle and the control member as the ramp assembly is closed. In this position, the control member is prevented from moving about its pivotal axis.

An important feature of the ramp assembly 1 is the elongated control member 52 that is pivotally mounted to ramp member 13 and is best seen in FIGS. 2, 4, 5, 10 and 11. The control member 52 is mounted for movement about axis 54 that is substantially parallel to axis 17. As the ramp assembly 1 opens, the weight of the first portion 56 of the control member 52 tends to swing the first portion 56 about the axis 54 toward the ramp member 3. The first portion 56 has switch means 58. Flexible strap member 60 which is secured at one end to the floor of the vehicle 5 and at the other end to the control member 52 limits pivotal movement of the first portion 56 of the control member 52 toward the ramp member 3 and holds it away from the ramp members 3 and 11 with the switch means 58 at approximately hand level to someone in the wheel chair. As ramp assembly closes, the surface 62 on the second portion 64 of the control member 52 pinches a folded portion of the strap member 60 between it and the floor of the vehicle 5 as illustrated in FIG. 11. This draws the strap member 60 taut and prevents movement of the control member 52 about the pivotal axis 54. As shown in FIGS. 5 and 11, the first portion 56 of the control member 52 is held in an upright position when the ramp assembly 1 is closed.

Figures 4, 12, 13:
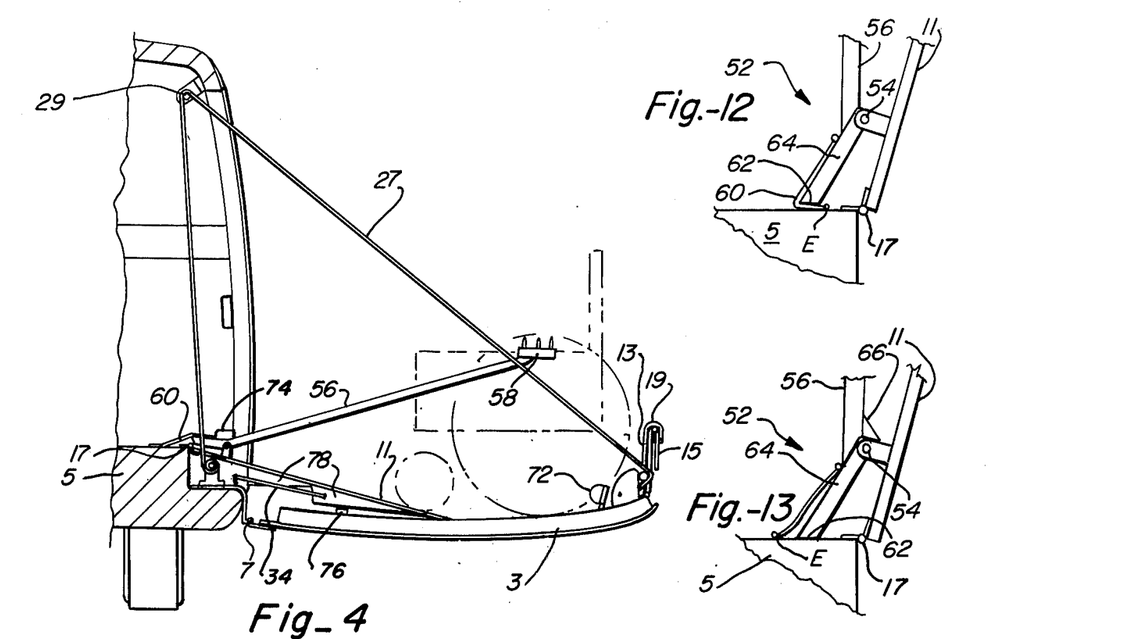
FIG. 4 is a view similar to FIG. 2 showing the ramp assembly supported off the ground in a substantially horizontal position. In this view, the outer ramp members have been pivoted to a position to prevent the wheel chair from rolling off the ramp assembly in the direction away from the vehicle.
FIG. 12 shows another way to hold the control member upright when the ramp assembly is closed. In this embodiment, one end portion of the strap member is secured with the end E toward the pivotal axis so that the taut strap member extends about the control member.
FIG. 13 illustrates a third manner of holding the control member upright in which the control member directly abuts the floor of the vehicle to prevent movement in one direction about the pivotal axis and a stop on the support of the pivot means prevents movements in the other direction.

FIGS. 12 and 13 show other arrangements to hold the first portion 56 of the control member 52 upright so that as little as possible of the ramp assembly 1 extends into the vehicle 5. This increases the available space within the vehicle 5 over past assemblies. In FIG. 12, the surface 62 of the control member 52 pinches the strap member 60 between the floor of the vehicle 5 and the surface 62 to draw the strap member 60 taut and prevent movement of the control member 52 about its axis 54. In FIG. 13, the surface 62 directly abuts the floor of the vehicle 5 to prevent pivotal movement in one direction while stop 66 prevents pivotal movement in the other direction.

The invention also includes a warning light system, a step arrangement, and limit switches to automatically stop the ramp assembly 1 when it reaches the substantially vertical, closed position or an open position in which ramp members 3, 13, and 15 are substantially coplanar. As best seen in FIGS. 1–4, the warning light system consists of lights 68 and 70 within the vehicle 5, flashing red light 72 on the main ramp member 3, and control switch 74 with actuator 76 on the main ramp member 3. As soon as the ramp assembly 1 opens far enough to break contact between the control switch 74 and the actuator 76, warning lights 68 and 70 along with the flashing red light 72 are turned on. The warning light system not only alerts oncoming cars that the ramp assembly 1 is extending beyond the normal bounds of the vehicle 5 but also reminds the driver to raise the ramp assembly 1 before he drives off.

Figure 9:
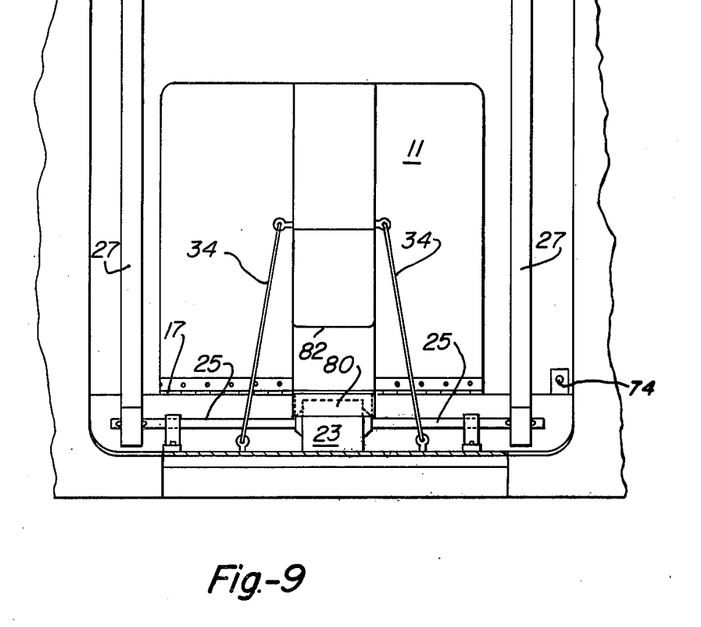
Figure 10:
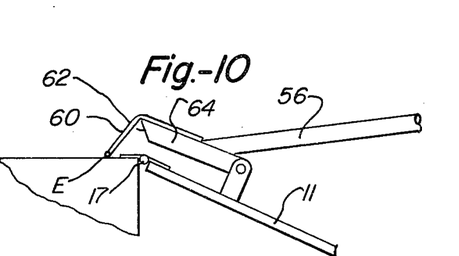
FIG. 10 shows the details of the elongated control member that is pivotally mounted to one of the ramp members. In the position shown as FIG. 10, ramp assembly is in the open position and the control member is being supported away from the ramp member as shown in FIGS. 1 and 2.

The new step arrangement includes the built-in steps 78 in ramp 11 and the step cover 80 over the motor 23. The ramp member 11 has a cut-out portion 82 as shown in FIG. 9 that moves about the step cover 80 of the motor 23. The weight of the step cover 80 keeps it over the motor 23, however, it can be pivoted upwardly about the axis 17 to provide access to the motor 23. The step arrangement enables a walking person to more easily use the ramp assembly or push a wheel chair over the ramp assembly.

The automatic stop system for the motor 23 is also actuated by the control switch 74 on the vehicle and the actuator 76 on the main ramp member 3. When the ramp assembly 1 is in the closed position, actuator 76 contacts the control switch 74 to turn the motor 23 off. Referring to FIGS. 6 and 7, as the ramp assembly 1 is lowered, the main ramp member 3 contacts the ground. Further unwinding of strap members 27 from about member 25 will allow the biasing means 36 to move the ramp member 13 into substantially coplanar alignment with the main ramp member 3. Motor switch 84 is biased in the off position as shown in FIG. 6. As the spring 40 of the biasing means 36 moves the rod member 38 outwardly of the sleeve member 42, the rod member 38 which had previously held the motor switch 84 away from its off position (see FIG. 7) is moved so that motor switch 84 can move to its biased off position.

In operation, the ramp assembly 1 is first moved to its open position whereby a person in a wheel chair can roll the wheel chair onto the main ramp member 3. If the ramp assembly 1 is initially closed, it can be opened by operating the control panel 86 on the outside of the vehicle 5. The ramp assembly 1 can also be operated by a control panel (not shown) located within the vehicle 4. Once on the ramp assembly 1 and within reach of the control switch 58, the motor 23 can be actuated to rotate member 25 and wrap strap members 27 about it. As strap members 27 are wound around member 25, outer ramp members 13 and 15 are moved from the coplanar position shown in FIG. 6 to the folded position of FIG. 7. As shown in FIG. 4, outer ramp members 13 and 15 form a backstop in their folded position to keep the wheel chair from rolling off the main ramp member 3. Continued operation of the motor 23 will raise the ramp assembly 1 to a substantially horizontal position from which the person can roll the wheel chair into the vehicle 5. Once inside, the person can operate the control panel within the vehicle 5 to raise the ramp assembly 1 to its closed position shown in FIG. 5. To leave the vehicle 5, the procedure is reversed. The warning light system of lights 68, 70 and 72 are turned on whenever the ramp assembly 1 is away from its closed position. The automatic stop system for the motor 23 consisting of control switch 74, actuator 76, and motor switch 84 will automatically stop the motor 23 when the ramp assembly 1 is in its closed position or in its open position in which the biasing means 36 has moved the outer ramp members 13 in a position substantially coplanar with the main ramp member 3.

While several embodiments of the present invention have been described in detail herein, various changes and modifications can be made without departing from the scope of the invention.

I claim:

1. A ramp assembly for use with a vehicle having an opening into the interior thereof, said ramp assembly comprising:

ramp means, said ramp means including at least one ramp member, means operably connected to said ramp member for pivotally mounting said ramp member to said vehicle for movement about a first substantially horizontal axis located adjacent the opening into the vehicle, means operably connected to said ramp means for reversibly moving said ramp member about said first pivotal axis between an open position providing access to and from the interior of said vehicle through said opening and a substantially vertical position, control means operably connected to said moving means for controlling the operation of said moving means, said control means including an elongated member, means operably connected to the elongated member for pivotally mounting said elongated member of said control means to said ramp member for movement about a second pivotal axis, said elongated member of the control means including at least a first portion extending outwardly of said second pivotal axis and having a switch means, and, means to limit the pivotal movement of said first portion of said elongated member about said second pivotal axis in a direction toward said ramp member when said ramp member is in an open position, said limiting means including a flexible strap attached to said vehicle and to the elongated member whereby said first portion is supported at an acute angle relative to said ramp member.

2. The ramp assembly of claim 1 wherein said second pivotal axis is substantially parallel to said first pivotal axis.

3. A ramp assembly for use with a vehicle having an opening into the interior thereof, said ramp assembly comprising:

ramp means, said ramp means including at least one ramp member, means operably connected to said ramp member for pivotally mounting said ramp member to said vehicle for movement about a first substantially horizontal axis located adjacent the opening into the vehicle, means operably connected to said ramp means for reversibly moving said ramp member about said first pivotal axis between an open position providing access to and from the interior of said vehicle through said opening and a substantially vertical position, control means operably connected to said moving means for controlling the operation of said moving means, said control means including an elongated member, and, means operably connected to the elongated member for pivotally mounting said elongated member of said control means to said ramp member for movement about a second pivotal axis, said elongated member of the control means including a first portion extending outwardly of said second pivotal axis and having a switch means and including a second portion joined to said first portion at an angle, said joint being located adjacent said second pivotal axis, said second portion of the elongated member having a first end spaced outwardly of said second pivotal axis which abuts a portion of the vehicle as said ramp member is moved from an open position to the substantially vertical position to limit the pivotal movement of said first portion of the elongated member about said second pivotal axis in the direction away from the ramp member toward the interior of the vehicle when said ramp member is in the substantially vertical position.

4. The ramp assembly of claim 3 further including:

means to limit the pivotal movement of the first portion of the elongated member toward said ramp member when said ramp member is in the substantially vertical position.

5. A ramp assembly for use with a vehicle having an opening into the interior thereof, said ramp assembly comprising:

ramp means, said ramp means including at least one ramp member, means operably connected to said ramp member for pivotally mounting said ramp member to said vehicle for movement about a first substantially horizontal axis located adjacent the opening into the vehicle, means operably connected to said ramp means for reversibly moving said ramp member about said first pivotal axis between an open position providing access to and from the interior of said vehicle through said opening and a substantially vertical position, control means operably connected to said moving means for controlling the operation of said moving means, said control means including an elongated member, means operably connected to the elongated member for pivotally mounting said elongated member of said control means to said ramp member for movement about a second pivotal axis, said elongated member of the control means including first and second portions rigidly joined to each other at an angle, said joint being located adjacent said second pivotal axis, said first portion extending outwardly of said second pivotal axis and having a switch means, and, means to limit the movement of said first portion of elongated member about the second pivotal axis toward and away from said ramp member when said ramp member is in the substantially vertical position whereby said first portion is supported at a first acute angle relative to said ramp member.

6. The ramp assembly of claim 5 wherein:

said second portion of the elongated member of the control means has an end spaced outwardly of the second pivotal axis, and, said limiting means includes a strap member attached to said vehicle and to said elongated member of the control means, means to secure said strap near one end thereof to said vehicle at a point closer to said first pivotal axis of the ramp member than the distance said one end of the second portion of the elongated member is spaced from the second pivotal axis whereby a middle portion of said strap member is pinched between the one end of the second portion of the elongated member and the secured portion of the strap member as the ramp member is moved from an open position to the substantially vertical position to limit the movement of said first portion of the elongated member about said second pivotal axis toward and away from said ramp member.

7. The ramp assembly of claim 5 wherein:

said limiting means further limits the pivotal movement of said first portion of the elongated member about said second pivotal axis in a direction toward said ramp member when said ramp member is in an open position whereby said first portion is supported at a second acute angle relative to said ramp member, said first acute angle being less than said second acute angle.

8. A ramp assembly for use with a vehicle having an opening into the interior thereof, said ramp assembly comprising:

ramp means, said ramp means including first and second ramp members and means operably connected to said first ramp member for pivotally mounting said first ramp member to said second ramp member for movement about a first pivotal axis, means operably connected to said first ramp member for pivotally mounting said first ramp member to said vehicle for movement about a second pivotal axis located adjacent the opening into the vehicle, said second pivotal axis being fixed relative to said vehicle and being substantially parallel to said first pivotal axis, means to continuously bias said second ramp member toward a substantially co-planar position with said first ramp member, means to limit the pivotal movement of said second ramp member relative to said first ramp member in a first direction about said first pivotal axis, means operably connected to said second ramp member for reversibly moving said ramp means about said second pivotal axis between an open position providing access to and from the interior of said vehicle through said opening and a substantially vertical position, said moving means moving said ramp means from an open position to said substantially vertical position by first moving the second ramp member about said first pivotal axis in said first direction against the biasing force of said biasing means until said limiting means prevents further movement relative to said first ramp member and then moving said ramp means about said second pivotal axis to said substantially vertical position, a third ramp member and means operably connected to said third ramp member for pivotally mounting said third ramp member to said second ramp member for movement about a third pivotal axis, said third pivotal axis being substantially parallel to said first and second pivotal axis, and, means operably connected to said first and third ramp members for moving said third ramp member into substantially co-planar alignment with said second ramp member as said first and second ramp members are moved by said biasing means into said substantially co-planar position.

9. The ramp assembly of claim 8, wherein said means for moving the third ramp member into co-planar alignment with said second ramp member includes a flexible strap member secured to said first and third ramp members.

10. A ramp assembly for use with a vehicle having an opening into the interior thereof, said ramp assembly comprising:

ramp means, said ramp means including first and second ramp members and means operably connected to said first ramp member for pivotally mounting said first ramp member to said second ramp member for movement about a first pivotal axis, means operably connected to said first ramp member for pivotally mounting said first ramp member to said vehicle for movement about a second pivotal axis located adjacent the opening into the vehicle, said second pivotal axis being fixed relative to said vehicle and being substantially parallel to said first pivotal axis, means to bias said second ramp member in a substantially co-planar position with said first ramp member, means to limit the pivotal movement of said second ramp member relative to said first ramp member in a first direction about said first pivotal axis, means operably connected to said second ramp member for reversibly moving said ramp means about said second pivotal axis between an open position providing access to and from the interior of said vehicle through said opening and a substantially vertical position, said moving means moving said ramp means form an open position to said substantially vertical position by first moving the second ramp member about said first pivotal axis in said first direction against the biasing force of said biasing means until said limiting means prevents further movement relative to said first ramp member and then moving said ramp means about said second pivotal axis to said substantially vertical position, said ramp means being in an open position when said first and second ramp members are biased in a substantially co-planar position, said moving means moving said ramp means from said substantially vertical position to an open position by moving said ramp means about said second pivotal axis until a portion of said first ramp member contacts the ground whereupon further operation of said moving means permits the biasing means to move the second ramp member about said first pivotal axis into substantially co-planar alignment with said first ramp member, and, means operably connected to said biasing means to automatically stop said moving means when said first and second ramp members are in the substantially co-planar position.

11. The ramp assembly in claim 10 wherein:
said biasing means includes a rod member operably connected at one end to said second ramp member, a sleeve member operably connected to said first ramp member and slidably receiving said rod member, and a spring means biasing said rod member in a first position with said one end extending outwardly of said sleeve member to align said first and second ramp members in a substantially co-planar position, and,
said automatic stopping means includes a switch means operably connected to said rod member and actuated in response to movement of the rod member to said first position to stop said moving means.

12. A ramp assembly for use with a vehicle having an opening into the interior thereof, said ramp assembly comprising:
ramp means, said ramp means including a main ramp member and a secondary ramp member, said secondary ramp member having a first side with step means,
means operably connected to said main ramp member for pivotally mounting said main ramp member to said vehicle for movement about a first substantially horizontal, fixed axis located adjacent to the opening into the vehicle,
means operably connected to the said secondary ramp member for pivotally mounting said secondary ramp member to said vehicle for movement about a second substantially horizontal, fixed axis located adjacent to the opening into the vehicle, said first and second pivotal axes being substantially parallel,
means operably connected to said ramp means for reversably moving said main ramp member about said first pivotal axis between an open position providing access to and from the interior of said vehicle through said opening and a substantially vertical position, said moving means including means to bias a portion of said secondary ramp member against said main ramp member when said main ramp member is in the substantially vertical position, said portion of the second ramp member being spaced from said second pivotal axis and slideably moveable relative to said main ramp member as said main ramp member moves about said first pivotal axis from said substantially vertical position to an open position, said moving means including a motor means positioned substantially between said first and second pivotal axes and a motor cover pivotally mounted to said vehicle for movement about a pivotal axis, said motor cover being pivotally moveable and extending over said motor means to form a step, and,
said secondary ramp member further having a cut out portion adjacent said motor means and said motor cover, said cut out portion being substantially in alignment with the step means of said secondary ramp member whereby said motor cover extends through said cut out portion when said ramp means is in an open position to form an additional step in alignment with the step means of said secondary ramp member.

13. A ramp assembly for use with vehicle having an opening into the interior thereof, said ramp assembly comprising:
ramp means, said ramp means including a main ramp member,
means connected operably to said main ramp member for pivotally mounting said main ramp member to said vehicle for movement about a first axis located adjacent the opening into the vehicle,
means operably connected to said ramp means for reversibly moving said main ramp member about said first pivotal axis between an open position providing access to and from the interior of said vehicle through said opening and a substantially vertical, closed position, said moving means including a motor means mounted to said vehicle adjacent the first pivotal axis and having a reversibly rotatable member, at least one flexible member attached at one end portion to the rotatable member of said motor means and at the other end portion to said ramp means, and support means spaced above said motor means to slidably support the middle of said flexible member,
control means for selectively operating said motor means in a first direction to wind said one end portion of the flexible member about said rotatable member of the motor means to draw the second end portion of the flexible member toward the vehicle and raise said main ramp member and in a second direction to unwind said flexible member from said rotatable member of the motor means to control the lowering of the main ramp member,
a secondary ramp member having a first side with step means, means operably connected to said secondary ramp member for pivotally mounting said secondary ramp member to said vehicle for movement about a second axis located adjacent the opening into the vehicle, said second pivotal axis being substantially parallel said first pivotal axis,
said moving means including means to bias a portion of said secondary ramp member against said main ramp member when said main ramp member is in a substantially vertical position, said portion of the second ramp member being spaced from said second pivotal axis and slidably moveable relative to said main ramp member as said main ramp member moves about said pivotal axis from said substantially vertical position to an open position,
said motor means of the moving means being positioned substantially between said first and second pivotal axes and said moving means including a motor cover pivotally mounted to said vehicle for moving about a pivotal axis, said motor cover being pivotally moveable and extending over said motor means to form a step, and, said secondary ramp member further having a cutout portion adjacent said motor means and said motor cover, the cutout portion being substantially in alignment with the step means of said secondary ramp member whereby said motor cover extends through said cutout portion when said ramp member is in the open position to form an additional step in alignment with the step means of said secondary ramp member.

* * * * *